United States Patent
Janszen et al.

(10) Patent No.: US 8,794,288 B2
(45) Date of Patent: Aug. 5, 2014

(54) METHOD FOR TRANSFERRING AND PLACING BEADS FOR TYRES, DEVICE FOR CARRYING OUT SUCH A METHOD AND SPACER TO BE USED IN SUCH A METHOD AND/OR DEVICE

(75) Inventors: Cornelis Wouteres Janszen, ZL Harderwijk (NL); Gerrit Mulder, NS Oene (NL); Wubbo Pieter De Vries, NZ Hoogeveen (NL); Pieter Cornelis Meijers, WK Maartensdijk (NL); Ronald Theodoor Noppers, BK Apeldoorn (NL)

(73) Assignee: VMI Holland B.V., Epe (NL)

( * ) Notice: Subject to any disclaimer, the term of this patent is extended or adjusted under 35 U.S.C. 154(b) by 277 days.

(21) Appl. No.: 12/544,533

(22) Filed: Aug. 20, 2009

(65) Prior Publication Data
US 2010/0043947 A1    Feb. 25, 2010

Related U.S. Application Data

(60) Provisional application No. 61/090,752, filed on Aug. 21, 2008.

(51) Int. Cl.
*B29D 30/48* (2006.01)

(52) U.S. Cl.
USPC .......................................... 156/403; 156/398

(58) Field of Classification Search
USPC ........... 156/130.7, 131, 135, 396, 403, 406.2, 156/407, 572, 398, 563; 414/795.6; 206/303, 499, 503, 505, 506, 507, 515, 206/516, 518
See application file for complete search history.

(56) References Cited

U.S. PATENT DOCUMENTS

| 1,379,369 | A |   | 5/1921 | Stevens |
| 3,603,579 | A | * | 9/1971 | Odom ............................. 269/28 |
| 3,895,986 | A |   | 7/1975 | Komatsu et al. |

(Continued)

FOREIGN PATENT DOCUMENTS

| DE | 10 2006 051 540 A1 | 5/2008 |
| EP | 0 624 456 A1 | 11/1994 |

(Continued)

OTHER PUBLICATIONS

Machine-generated Engliash translation of JP 2003-191346.*

(Continued)

*Primary Examiner* — Martin Rogers
(74) *Attorney, Agent, or Firm* — Ladas & Parry LLP

(57) ABSTRACT

Method for transferring and placing beads for tires, providing:
a bead storage unit in which a number of beads are vertically stacked placing spacers in between them, a collection unit for empty spacers, placed in the vicinity of the bead storage unit,
a tire building machine for receiving the beads thereon,
a bead retaining means for picking up and retaining a bead, wherein the bead retaining means is provided with engagement jaws that are arranged at equal angular distance in a circumferential direction on the bead retaining means, wherein the engagement jaws are driven or withdrawn in radial direction,
a spacer retaining means for picking up and retaining a spacer, and
arranging the bead retaining means and the spacer retaining means on a common transfer means. The spacer retaining means is provided with at least two spacer engagement jaws that are arranged at equal angular distance in a circumferential direction on the spacer retaining means, wherein the spacer engagement jaws are driven or withdrawn in radial direction.

11 Claims, 7 Drawing Sheets

(56) References Cited

U.S. PATENT DOCUMENTS

Figure 1:
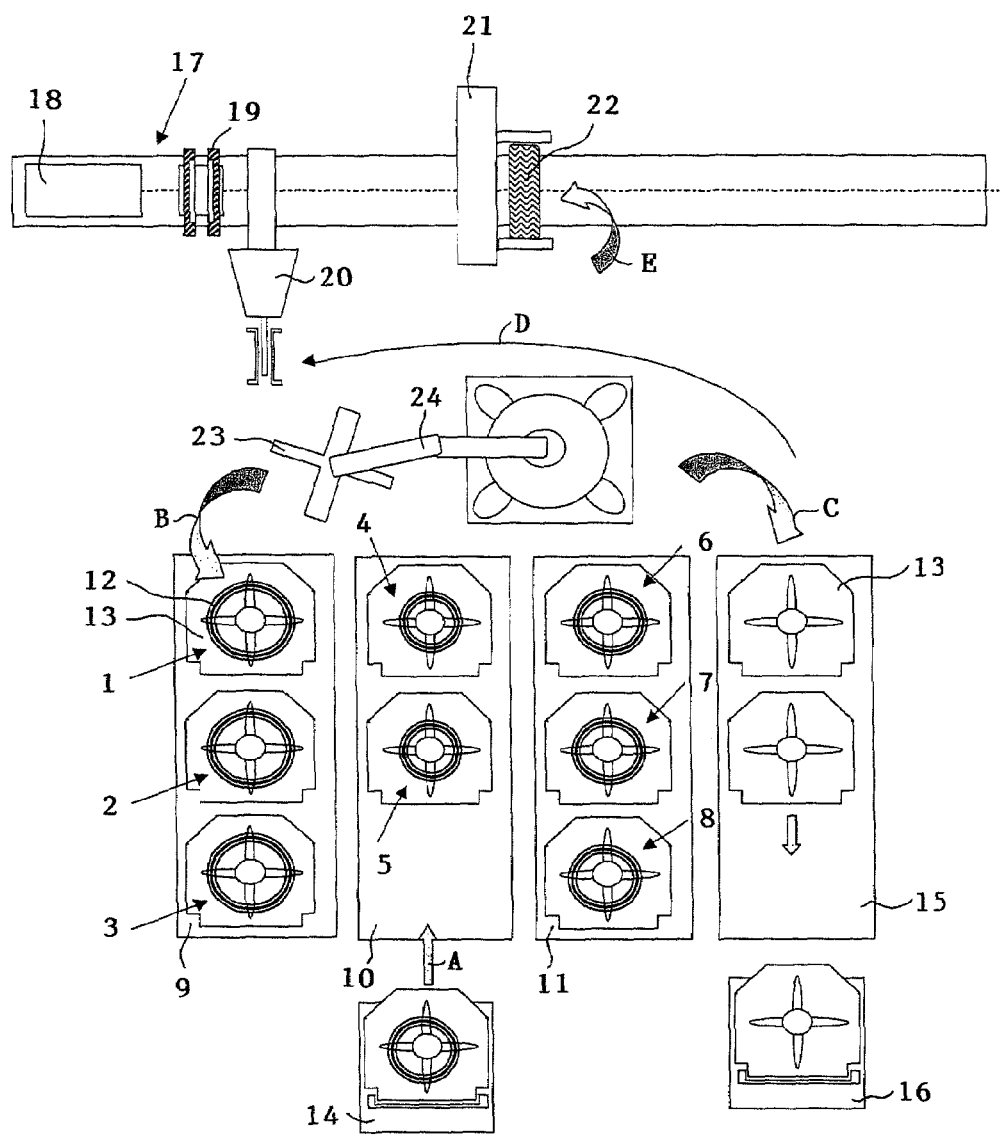

| | | | | |
|---|---|---|---|---|
| 4,148,680 | A | * | 4/1979 | Harding ................ 156/403 |
| 4,369,086 | A | * | 1/1983 | Nakahama et al. ........... 156/403 |
| 4,576,407 | A | * | 3/1986 | Lambert ................ 294/97 |
| 4,606,150 | A | * | 8/1986 | Grimm ................ 451/150 |
| 5,433,815 | A | * | 7/1995 | Aihara et al. ................ 156/403 |
| 5,520,501 | A | * | 5/1996 | Kouno et al. ................ 414/741 |
| 6,468,016 | B1 | * | 10/2002 | Roman ................ 414/331.06 |
| 6,817,589 | B2 | * | 11/2004 | Schmidgall et al. ........ 249/66.1 |
| 2006/0102410 | A1 | * | 5/2006 | Dvorak ................ 180/256 |
| 2006/0174785 | A1 | | 8/2006 | Kubin et al. |

FOREIGN PATENT DOCUMENTS

| | | | | |
|---|---|---|---|---|
| EP | 0 567 652 B1 | | 1/1997 | |
| EP | 1 724 100 A1 | | 11/2006 | |
| JP | 04-250028 | * | 9/1992 | ............ B29D 30/48 |
| JP | 06-199422 | * | 7/1994 | ............ B65G 59/10 |
| JP | 6-199422 A | | 7/1994 | |
| JP | 11-180558 A | | 7/1999 | |
| JP | 2002-11806 | * | 1/2002 | ............ B29D 30/32 |
| JP | 2002-11806 A | | 1/2002 | |
| JP | 2003-191346 | * | 7/2003 | ............ B29D 30/08 |
| JP | 2003-191346 A | | 8/2003 | |

OTHER PUBLICATIONS

Machine-generated English language translation of JP 06-199422 (original document dated Jul. 1994).*

Machine-generated English language translation of JP 2002-11806 (original document dated Jan. 2002).*

English language translation of JP 06-199422 (original document dated Jun. 1994).*

English language translation of JP 04-250028 (original document dated Apr. 1992).*

Office Action mailed Mar. 14, 2014 in connection with U.S. Appl. No. 13/756,571.

* cited by examiner

METHOD FOR TRANSFERRING AND PLACING BEADS FOR TYRES, DEVICE FOR CARRYING OUT SUCH A METHOD AND SPACER TO BE USED IN SUCH A METHOD AND/OR DEVICE

This application claims the benefit U.S. Provisional Application 61/090,752 filed Aug. 21, 2008, and incorporates the same by reference.

BACKGROUND OF THE INVENTION

The present invention relates to a method for transferring and placing beads for tyres, comprising the steps of:
providing a bead storage unit in which a number of beads are vertically stacked placing spacers in between them,
providing a collection unit for empty spacers, which collection unit is placed in the vicinity of the bead storage unit,
providing a tyre building machine for receiving the beads thereon,
providing a bead retaining means for picking up and retaining a bead, wherein the bead retaining means is provided with engagement jaws that are arranged at equal angular distance in a circumferential direction on the bead retaining means, wherein the engagement jaws are driven or withdrawn in radial direction,
providing a spacer retaining means for picking up and retaining a spacer, and
arranging the bead retaining means and the spacer retaining means on a common transfer means.

Such a method is known from EP-B1-0567652. In that method the spacer retaining means is formed by drawing means placed radially outside of the bead engagement jaws, which drawing means are able to pick up and retain the spacers by vacuum or magnetic force. For that purpose the drawing means are designed so as to be upwardly and downwardly movable.

SUMMARY OF THE INVENTION

It is among others an object of the present invention to provide an alternative method for transferring and placing beads for tyres.

For that purpose according to the invention a method of the type mentioned in the preamble is characterised in that the method comprises the steps of:
providing the spacer retaining means with at least two spacer engagement jaws that are arranged at equal angular distance in a circumferential direction on the spacer retaining means, wherein the spacer engagement jaws are driven or withdrawn in radial direction. By instead of the known drawing means that can move upwards and downwards by means of vacuum or magnetic force, using spacer engagement jaws according to the invention that can be radially driven or withdrawn, an alternative method is provided that can be carried out relatively easily and accurately.

In one embodiment of a method according to the invention the method comprises the steps of:
providing the spacer retaining means with two spacer engagement jaws placed opposite each other, wherein the engagement jaws are driven or withdrawn in radial direction, and
providing the spacer retaining means with two balancing pins placed opposite each other and at equal angular distance between the spacer engagement jaws. In that way the spacer retaining means is made with a relatively low number of movable parts, as a result of which the method can be carried out relatively easily.

In a further embodiment of a method according to the invention, the method comprises the steps of:
providing the spacer with a central aperture, wherein the spacer is provided with an inner ring defining the central aperture,
placing the spacer engagement jaws radially in the central aperture,
driving the spacer engagement jaws in radial direction until they will engage the inner ring. In that way the spacer retaining means is designed compact and picking up the spacers only requires a slight movement of the spacer engagement jaws, as a result of which the method can be carried out relatively fast.

In one further embodiment of a method according to the invention the method comprises the steps of:
providing the spacer with a conical surface, which conical surface encloses a spacer angle having a value in a range of approximately 8° to approximately 20°,
at said spacer angle in radial direction driving or withdrawing the spacer engagement jaws and the bead engagement jaws. In particular said method comprises the steps of:
providing the bead with a bead apex that is at a bead apex angle, and
choosing a spacer angle that is approximately 1° to approximately 3° smaller than the bead apex angle. As the bead is usually placed on the spacer when still in a hot condition, said choice of the spacer angle ensures that the bead and particularly the bead apex is supported with as little deformation of the bead apex as possible. In that way the method is able to ensure a highly accurately manufacturing of tyres.

In an advantageous embodiment of a method according to the invention the method comprises the steps of:
picking up and retaining a bead with related spacer from a stack of beads including spacers from the bead storage unit,
moving the picked up and retained bead including related spacer to the collection unit for empty spacers, wherein during the movement the bead retaining means picks up the bead from the spacer and retains it. As the bead is picked up from the spacer during the movement of the bead and the related spacer to the collection unit for empty spacers, it is ensured that the method can be carried out relatively fast. After the spacer has been placed on the collection unit, the bead can immediately be conveyed further to the tyre building machine, without an additional action being needed.

The invention furthermore relates to a device for carrying out the method according to the invention, which device is provided with
a bead storage unit for vertically stacking a number of beads in there while placing spacers in between them,
a collection unit for empty spacers, which collection unit can be placed in the vicinity of the bead storage unit,
a tyre building machine adapted for receiving beads thereon,
a bead retaining means for picking up and retaining a bead, wherein the bead retaining means is provided with engagement jaws that are arranged at equal angular distance in a circumferential direction on the bead retaining means, wherein the engagement jaws can be driven or withdrawn in radial direction, a spacer retaining means for picking up and retaining a spacer, wherein the bead retaining means and the spacer retaining means are arranged on a common transfer means, wherein the spacer retaining means is provided with at least two spacer engagement jaws that are arranged at equal angular distance in a circumferential direction on the spacer retaining means, wherein the spacer engagement jaws can be driven or withdrawn in radial direction.

In one embodiment of a device according to the invention the spacer retaining means is provided with two spacer engagement jaws placed opposite each other, wherein the engagement jaws can be driven or withdrawn in radial direction, and the spacer retaining means is further provided with two balancing pins placed opposite each other and at equal angular distance between the spacer engagement jaws.

In one further embodiment of a device according to the invention, the device contains spacers, wherein each spacer is provided with a central aperture, wherein the spacer is provided with an inner ring defining the central aperture, and that the spacer engagement jaws in a first position can be placed radially in the central aperture, and can be placed in a second position in which the spacer engagement jaws are in engagement with the inner ring.

In a further embodiment of said device the spacer is provided with a conical surface, which conical surface encloses a spacer angle having a value in a range of approximately 8° to approximately 20°, and the spacer engagement jaws and the bead engagement jaws can be driven or withdrawn in radial direction at said spacer angle. In particular said device comprises a bead having a bead apex that is at a bead apex angle, wherein the spacer angle is approximately 1° to approximately 3° smaller than the bead apex angle.

In a further embodiment of a device according to the invention the device is provided with a servomotor and a cardan joint for the bead engagement jaws.

In yet a further embodiment of a device according to the invention the device is provided with a pneumatic drive for the spacer engagement jaws.

In an advantageous embodiment of a device according to the invention the transfer means is further provided with tyre engagement jaws for engaging a green tyre and for removing the green tyre from the tyre building machine.

In a further embodiment of a device according to the invention the transfer means is further provided with tyre engagement jaws for engaging a green tyre and for removing a green tyre from the tyre building machine. In this way a separate unit for removing the green tyre will not be required.

The invention further relates to a spacer to be used in the method according to the invention and/or to be used in a device according to the invention, wherein the spacer is provided with a conical surface, which conical surface encloses a spacer angle having a value in a range of approximately 8° to approximately 20°.

In one embodiment of a spacer according to the invention the spacer is provided with an inner ring defining a central aperture, wherein the inner ring is provided with an upright edge.

In a further embodiment of a spacer according to the invention the spacer is provided with four slots arranged in a cross-shape. Said slots among others have a cooling purpose by allowing air circulation, and facilitate the removal of spacers from one another.

The aspects and measures described in this description and the claims of the application and/or shown in the drawings of this application may where possible also be used individually. Said individual aspects, such as particularly applying to the measures and aspects described per se in the sub claims, may be the subject of divisional patent applications relating thereto.

SHORT DESCRIPTION OF THE DRAWINGS

Figure 2:
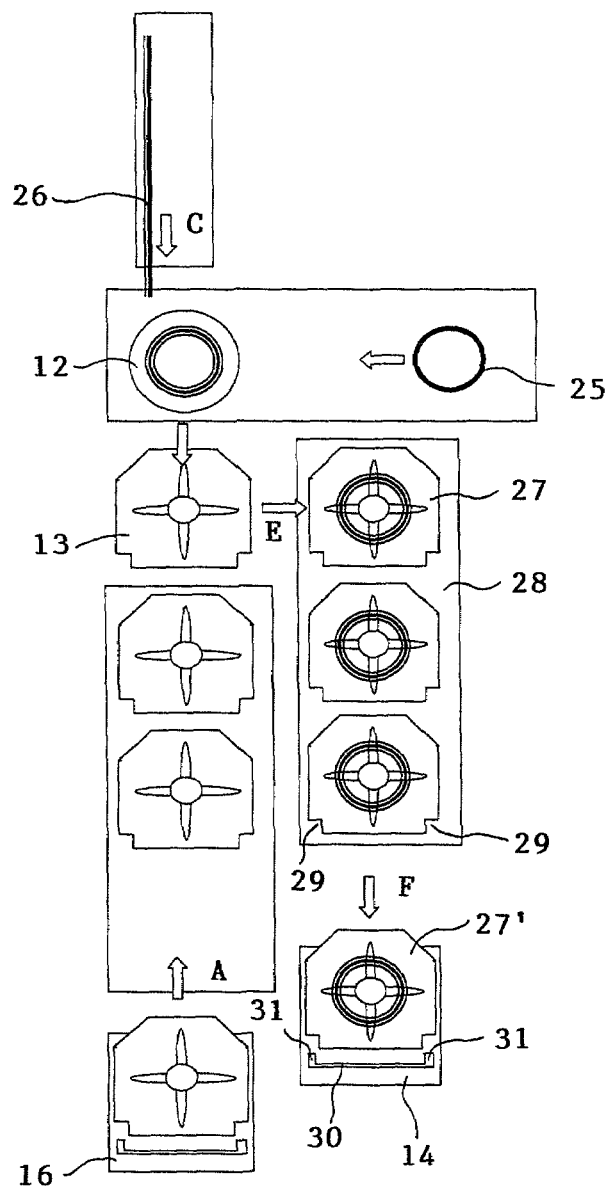
Figure 3:
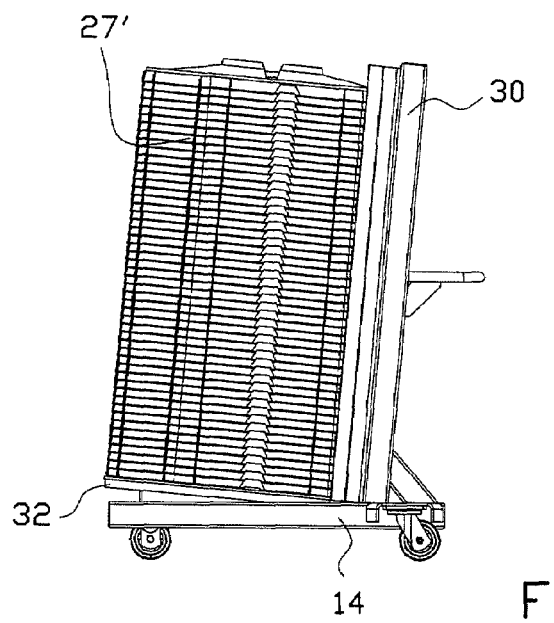
Figure 4A:
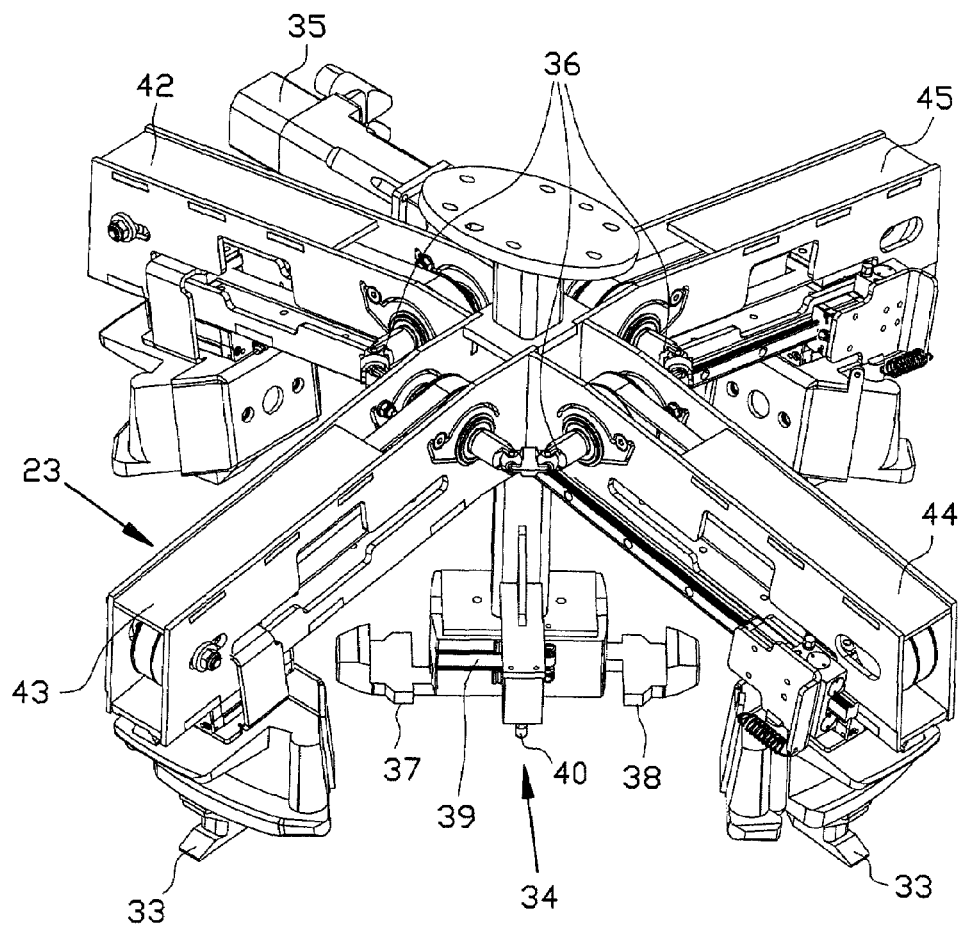
Figure 4B:
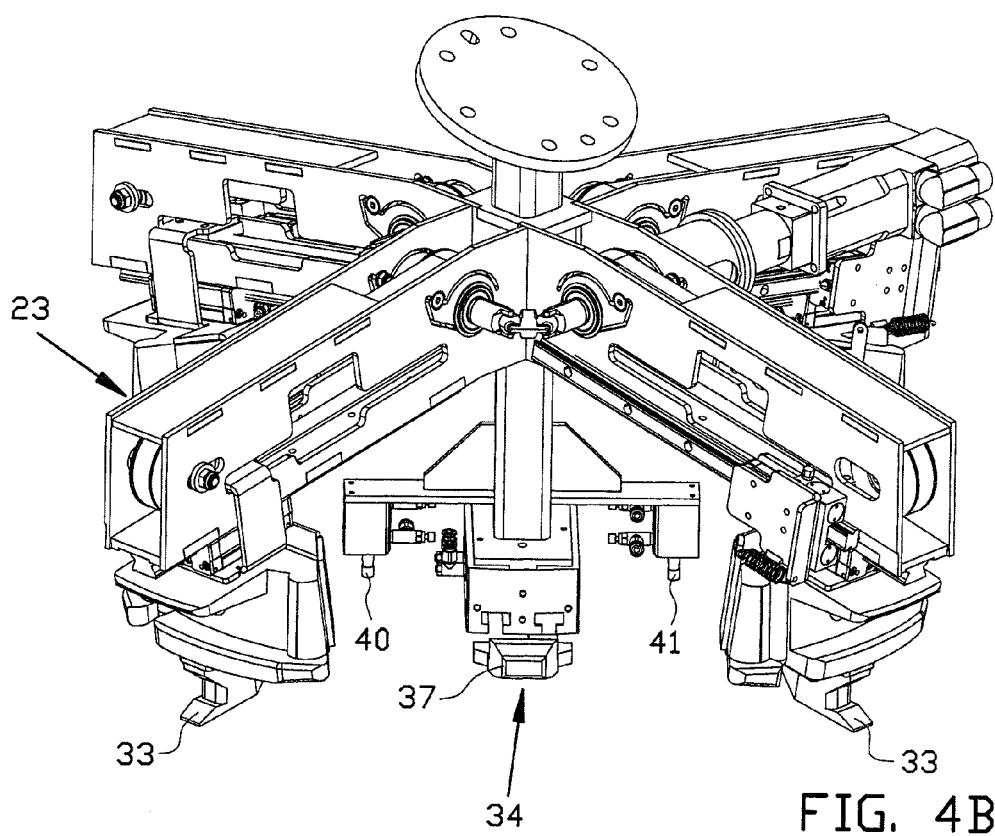
Figure 4C:
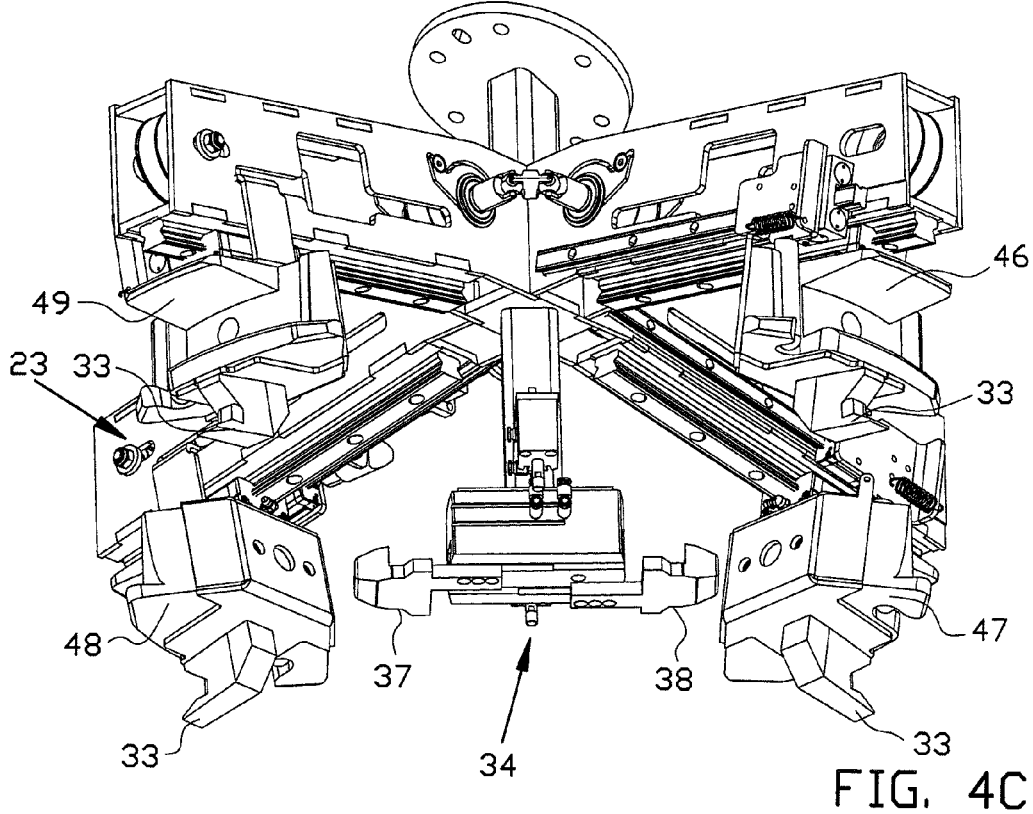
Figure 5A:
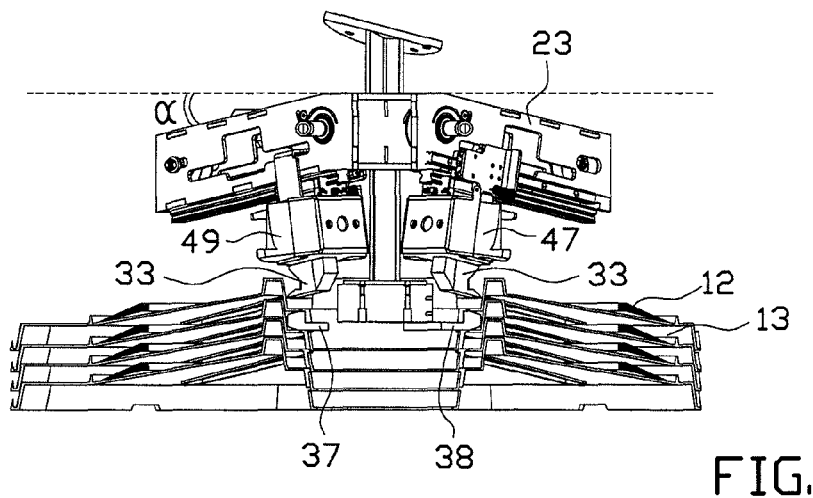
Figure 5B:
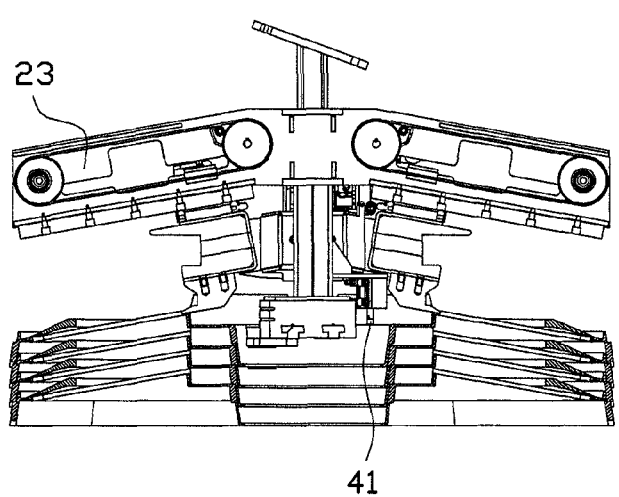
Figure 5C:
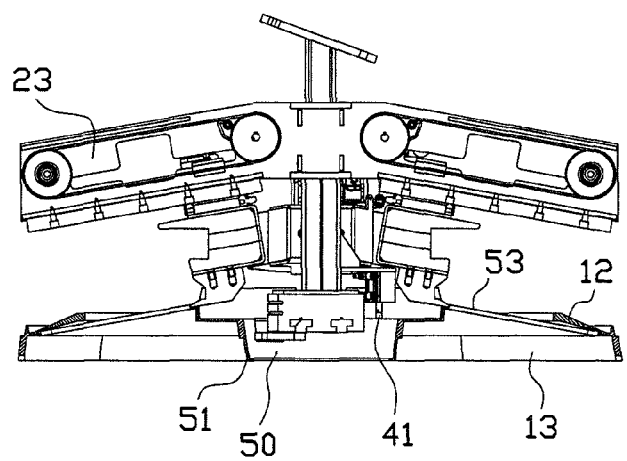
Figure 5D:
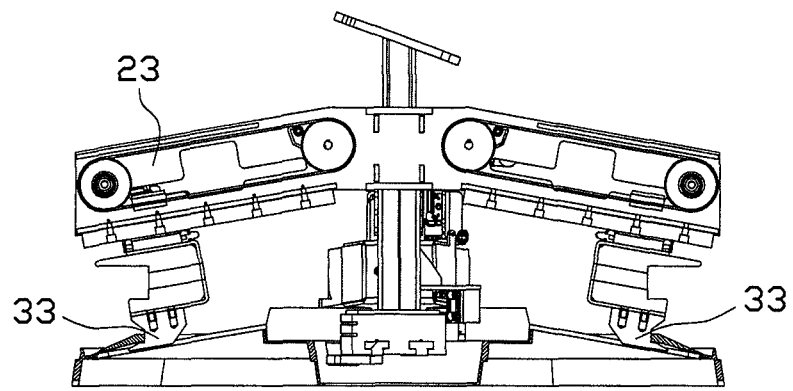
Figure 5E:
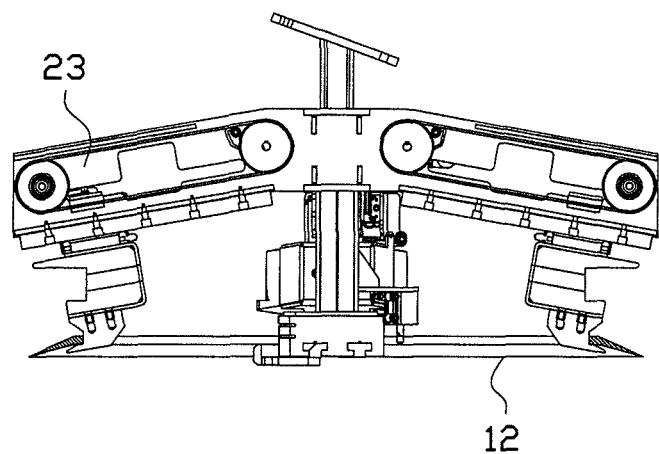
Figure 6A:
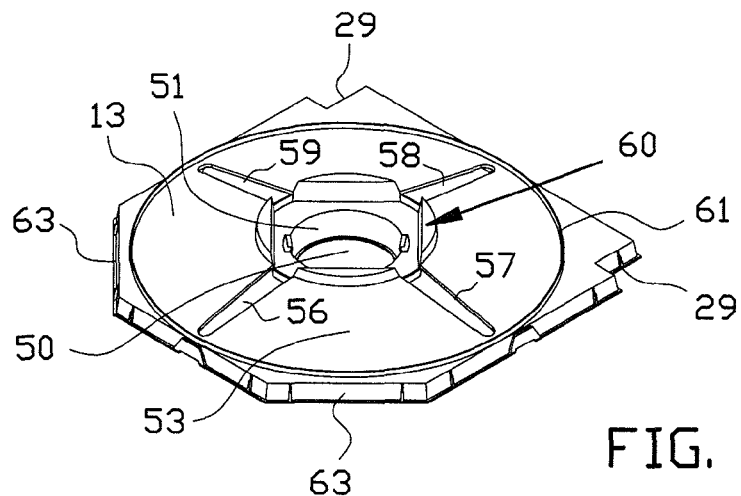
Figure 6B:
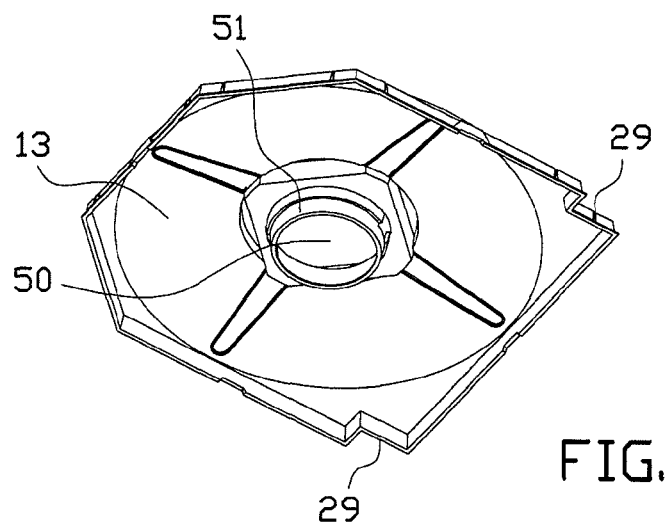
Figure 6C:
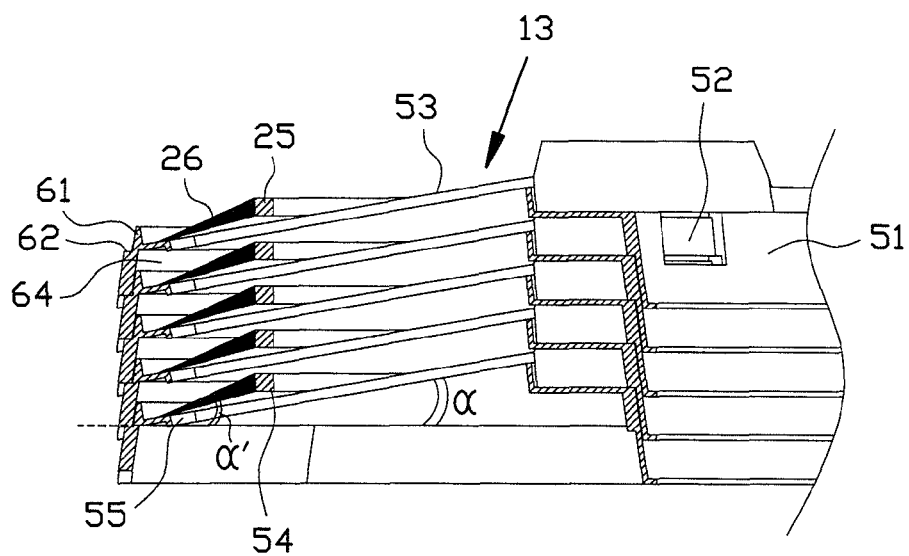

The invention will be elucidated on the basis of a number of exemplary embodiments shown in the attached drawings, in which:

FIG. 1 shows a schematic top view of a device for carrying out a method for transferring and placing beads for tyres, FIG. 2 shows a schematic top view of a unit for manufacturing beads and for placing such beads on a mobile part of a bead storage unit, FIG. 3 shows a schematic side view of a mobile part as shown in FIG. 2, FIGS. 4A-4C show schematically and in perspective a common transfer means part of the device as shown in FIG. 1, wherein a bead retaining means and a spacer retaining means have been arranged on the transfer means, FIGS. 5A-5E schematically show in cross-section some steps of picking up and retaining a spacer including bead by the bead retaining means and the spacer retaining means, FIGS. 6A and 6B show schematically and in perspective a spacer to be used in a device according to FIG. 1, and FIG. 6C shows a schematic view in cross-section of a stack of beads while placing spacers in between them.

DETAILED DESCRIPTION OF THE DRAWINGS

FIG. 1 schematically shows a top view of a device for carrying out a method for transferring and placing beads for tyres. The device is provided with a bead storage unit for vertically stacking a number of beads 12 in there while placing spacers 13 in between them. In the embodiment shown the bead storage unit comprises a first conveyor belt 9, on which (in the embodiment shown) three stacks of beads have been arranged. The beads placed on said conveyor belt have the same diameter. Furthermore a second conveyor belt 10 is provided with (in the embodiment shown) two stacks 4, 5 of beads having the same diameter that differs from the diameter of the beads placed on the first conveyor belt 9. A third conveyor belt 11 is furthermore provided on which (in the embodiment shown) three stacks 6, 7, 8 of beads have been placed that have the same diameter, which diameter differs from the diameter of the beads placed on the first conveyor belt 9 and which differs from the diameter of the beads placed on the second conveyor belt 10.

In FIG. 1 it is also indicated that a mobile unit 14 on which a stack of beads intended for the second conveyor belt is arranged, is placed at the feed end of the second conveyor belt 10. Said stack of beads (with spacers placed in between them), as indicated by the arrow, can be transferred onto the second conveyor belt.

The device further comprises a collection unit for empty spacers 13. Said collection unit is placed in the vicinity of the bead storage unit, as shown in FIG. 1. In the embodiment as shown in FIG. 1 the collection unit for empty spacers contains a conveyor belt 15 on which (in the embodiment shown) two vertical stacks of empty spacers (that means spacers without beads) have been placed. In FIG. 1 a mobile unit 16 is furthermore shown on which a vertical stack of empty spacers has just been placed. For that purpose the conveyor belt 15 can be driven as indicated by the arrow.

The device further comprises a tyre building machine 17 adapted for receiving beads thereon. In the embodiment shown in FIG. 1 the tyre building machine 17 comprises among others a rotatable building drum 18, a unit 19 for placing beads (also called "bead setter"), a loading device 20 (also called "bead loader") for loading beads thereon, and a unit 21 for removing a ready green tyre 22 from the building drum 18, which unit 21 can be moved with respect to the building drum 18 (or vice versa). Such a tyre building machine is known per se and therefore will not be discussed here in further detail.

As shown in FIG. 1 the device further comprises a common transfer means 23 for transferring beads to the bead loader 20. The common transfer means 23 for that purpose carries a bead retaining means to be further clarified below as well as a spacer retaining means. The common transfer means 23 in the embodiment shown in FIG. 1 is carried by a movable robot arm 24, that is movable such that the beads can be transferred to the bead loader 20 and empty spacers can be transferred to the conveyor belt 15. It is possible here to first remove a spacer including bead from a stack, for instance stack 1, and place it on the conveyor belt 15 (or place it on an empty spacer positioned thereon), and after that remove the bead from the spacer and transfer the bead to the bead loader. Alternatively the bead can also be removed from the spacer on the stack 1 and be transferred to the bead loader, after which the transfer means 23 returns to the stack 1 for picking up the empty spacer and places it on the conveyor belt 15 (or on an empty spacer positioned thereon). The invention, however, provides a further alternative, namely one in which the bead retaining means already picks up the bead from the spacer and retains it during the movement of a bead with related spacer that is picked up from a vertical stack of beads with spacers and retained, to the collection unit for empty spacers. Because during the movement of the bead and the related spacer to the collection unit for empty spacers the bead is picked up from said spacer, it is ensured that the method can be carried out relatively fast. After the spacer is placed on the collection unit, the bead can be immediately conveyed further to the tyre building machine, without an additional action being necessary. It will be clear that instead of by a robot arm the common transfer means can also be moved by means of a rail system or another alternative means.

FIG. 2 schematically shows a top view of a unit for manufacturing beads and for placing such beads on a mobile part of a bead storage unit. In this unit (known per se) a bead core 25 and a bead apex 26 are assembled into a bead 12 in a manner known per se, and therefore not further described herein. The manufactured (still warm) bead 12 is directly automatically placed on an empty spacer 13 (as indicated by the arrow), and subsequently the spacer 13 including bead 12 is stacked onto a vertical stack 27. Said vertical stack 27 is placed on a conveyor belt 28 which conveys stacks of the desired height to the mobile unit 14. Said mobile unit 14 can subsequently be moved by an operator or automatically to the conveyor belt 10 of FIG. 1.

For the sake of the stacking accuracy of the vertical stack of spacers on the mobile unit, on the one hand spacers are provided with square recesses 29 that are formed for accommodating a guide 30 with protrusions 31 that are arranged on the mobile unit 14. In that way rotation of the vertical stack of spacers is counteracted as much as possible. It will be clear that the recesses shown in FIG. 2 and the shape of the protrusions of the guide can be designed differently. FIG. 3 schematically shows a side view of the mobile unit 14 with a stack 27' of spacers placed thereon. It can clearly be seen here that the guide 30 inclines slightly backwards, and a bearing area 32 of the stack is placed inclined, so that the stack during conveyance remains in a properly defined position. Optionally the bearing area can be moved as regards height. It will be clear that the invention is not limited to the shown embodiment of a mobile unit but that many alternatives for moving a vertical stack of spacers with beads can be used. However, the embodiment shown as regards efficiency and simplicity is preferred. It will furthermore be clear that a mobile unit 16 comparable to the mobile unit 14 can be used for conveying vertical stacks of empty spacers from the device as shown in FIG. 1 to the unit as shown in FIG. 2.

FIGS. 4A-4C schematically and in perspective show a common transfer means 23 that is part of the device as shown in FIG. 1, wherein a bead retaining means 33 and spacer retaining means 34 are arranged on the transfer means 23. In this case the depiction of FIG. 4B is rotated 90° with respect to the depiction in FIG. 4A, and in FIGS. 4A and 4B a top view and in FIG. 4C a bottom view is shown.

The bead retaining means for picking up and retaining a bead is provided with (in the embodiment shown four) engagement jaws 33 that are arranged at equal angular distance in a circumferential direction on the bead retaining means 23 on radially extending arms 42, 43, 44, 45, wherein the engagement jaws 33 can be driven or withdrawn in radial direction. For that purpose a servomotor 35 is provided which by means of a multiple cardan joint 36 drives the bead engagement jaws 33. As a result an accurate and simultaneous drive of the engagement jaws 33 will become possible in a simple manner.

The common transfer means 23 further carries a spacer retaining means 34 for picking up and retaining a spacer. The spacer retaining means 34 is provided with two spacer engagement jaws 37, 38 which are arranged at equal angular distance in a circumferential direction on the spacer retaining means 34, wherein the spacer engagement jaws 37, 38 can be driven or withdrawn in radial direction, in the embodiment shown by a pneumatic drive 39. The spacer retaining means 34 is furthermore provided with two balancing pins 40, 41 placed opposite each other and at equal angular distance between the spacer engagement jaws 37, 38. The spacer engagement jaws 37, 38 engage onto corresponding recesses that are arranged in the spacer.

In an advantageous embodiment the transfer means 23 is furthermore provided with tyre engagement jaws 46, 47, 48, 49 for engaging a green tyre and for removing the green tyre from the tyre building machine, particularly its unit 21 (see FIG. 1). In this way a separate unit for removing the green tyre will not be necessary. In the embodiment shown in FIG. 4 the tyre engagement jaws 46, 47, 48, 49 are placed at the ends of the arms 42, 43, 44, 45, and the engagement jaws 33 are arranged at the tyre engagement jaws. Please note that the tyre engagement jaws, just like the bead engagement jaws, can be driven and withdrawn in radial direction, so drivable and withdrawable in radial direction. With these tyre engagement jaws a pin can be arranged, which prevents that the green tyre sticks to the engagement jaws.

FIGS. 5A-5C schematically show in cross-section some steps of picking up and retaining a spacer 13 including bead 12 by the bead retaining means and the spacer retaining means. The spacer 13 contains a central aperture 50, wherein the spacer 13 is provided with an inner ring 51 defining the central aperture 50 (see FIGS. 5C and 6A). The spacer engagement jaws 37, 38 in a first position can be placed radially in the central aperture 50, after which the pneumatic drive places them in a second position (see FIG. 5A) in which the spacer engagement jaws are in engagement with the inner ring 51, particularly a recess 52 (FIG. 6C) therein.

In the embodiment shown in the figures the spacer 13 is provided with a conical surface 53, which conical surface 53 encloses a spacer angle α (FIG. 6C), wherein α has a value in a range of approximately 8° to approximately 20°. The spacer engagement jaws 37, 38 and the bead engagement jaws 33 can be driven or withdrawn in radial direction at said spacer angle. As regards construction this can be realised relatively easily by mounting the arms 42, 43, 44, 45 at said spacer angle α (see FIG. 5A).

Although the surface of the spacers can be flat, due to preserving the shape of the bead it is preferred that the surface is conical having a spacer angle α that is approximately 1° to approximately 3° smaller than a bead apex angle α' enclosing the bead apex 26 with the horizontal (when placed on a horizontal surface) (FIG. 6C). Preferably said angle is chosen such that the inner edge circumference 54 of the bead core 25 as well as the outer circumference 55 of the bead apex 26 after placing the bead on the spacer are supported on the conical surface, without the original shape (which is the shape immediately after manufacturing) of the bead changing.

As shown in FIG. 5A the spacer engagement jaws 37, 38 engage into the related recesses 52 in the spacer. It may happen that the spacer 13 tilts slightly, because only two spacer engagement jaws are being used. The two pins 40, 41 have indeed been arranged to ensure that said tilting does not become too great, and therefore ensure balance. In FIG. 5B (rotated 90° with respect to FIG. 5A) it can be seen that one of the pins, pin 41, ensures a balance supporting point.

Subsequently the spacer 13 with the bead 12 positioned thereon is lifted from the stack (FIG. 5C), and the spacer 13 and the bead 12 are placed on top of a stack of empty spacers, and the spacer engagement jaws are withdrawn so that the spacer is released (FIG. 5D).

After that or simultaneously therewith the bead engagement jaws 33 are driven radially to the outside (by driving the servomotor and the multiple cardan joint), until the engagement jaws 33 engage the bead 12, after which the bead is lifted from the spacer stack (FIG. 5E). It will be clear that all this can be controlled such that first the bead will be removed from the spacer, so that the bead can be transferred to the bead loader, after which the empty spacer can be removed from the stack.

FIGS. 6A and 6B schematically show in perspective a spacer to be used in a device according to FIG. 1 and FIG. 6C shows a schematic view in cross-section of a stack of beads with spacers placed in between them. The spacer has been described in some detail above. In FIGS. 6A and 6B is can furthermore be seen that the spacer 13 is provided with four slots 56, 57, 58, 59 arranged in a cross-shape, which ensure a cooling function during intermediate storage (transportation via the mobile unit). A second function of said slots is to facilitate the removal of the spacer from a spacer situated below it. Without such slots when removing a spacer a vacuum could be created so that the spacer below it might remain stuck to the spacer on top of it.

The spacer 13 further has an upright inner edge 60, which is slightly smaller than the smallest inner diameter of the bead, and an upright outer edge 61, which is slightly larger than the largest outer diameter of a bead. In this way it is prevented that the bead may get beyond the circumferential edges of the spacer.

The spacers 13 are designed such (FIG. 6C) that for maintaining a proper stacking accuracy they support on each other at both the inner ring 51 and on the outer edge 61 (provided with a supporting edge 62) for optimal stability of the stack. Here a slit 64 (FIG. 6C) is formed between the outer edge 61 of the spacer lying underneath and a spacer lying on top, which allows sufficient air circulation for cooling.

For improving the stacking accuracy the spacer is designed substantially square, having the recesses 29 at one side, and bevellings 63 at the other side. The spacer has edges along the slots 56, 57, 58, 59 and preferably a wave pattern of edges (not shown), to reduce the abutment surface of the bead on the spacer, so that the bead "sticking" to the spacer is reduced.

The spacer shown in FIG. 6 is able to carry beads having dimensions in a range of approximately 13 inches to approximately 24 inches, wherein both the smallest size and the largest size are bounded by the inner edge 60 and the outer edge 61.

Below a short description follows of the method for transferring a bead wherein reference is made to FIG. 1.

Full stacks of spacers (that means including beads) are and will be placed by the mobile unit 14 on the conveyor path (in the direction indicated by arrow A for the stack related to the conveyor belt 10).

The spacer retaining means takes the spacer with the bead from the stack, because the two spacer engagement jaws arranged at equal angular distance in a circumferential direction on the spacer retaining means are driven in radial direction, arrow B in FIG. 1.

Subsequently the spacer with bead assembly is placed on an empty stack 13 on the conveyor belt 15, arrow C, and the spacer is released because the two spacer engagement jaws arranged at equal angular distance in a circumferential direction on the spacer retaining means, are withdrawn in radial direction.

The bead is removed from the spacer because the bead engagement jaws are driven in radial direction and loaded in the bead loader 20 (arrow D). Please note that this has to be done twice per green tyre.

After the green tyre 22 is finished it is removed from the unit 21 by radially moving the tyre engagement jaws.

The empty stack of spacers on the conveyor belt 15 is removed from the conveyor belt 15 by a mobile unit 16, and conveyed to a unit for manufacturing new beads (FIG. 2).

The above description is included to illustrate the operation of preferred embodiments of the invention and not to limit the scope of the invention. Starting from the above explanation many variations that fall within the spirit and scope of the present invention, particularly as defined in the attached claims, will be evident to an expert.

The invention claimed is:

1. A device for transferring and placing beads for tyres, which device is provided with
    a bead storage unit for receiving a number of vertically stacked beads in there with spacers in between them to separate each bead, wherein each spacer is provided with a central aperture and an inner ring defining the central aperture,
    a tyre building machine adapted for receiving beads thereon,
    a bead retaining means for picking up and retaining a bead, wherein the bead retaining means is provided with engagement jaws that are arranged at an equal angular distance in a circumferential direction on the bead retaining means, wherein the engagement jaws are arranged to be driven towards or withdrawn away from the center of the bead retaining means,
    a spacer retaining means for picking up and retaining a spacer,
    wherein the spacer retaining means is provided with at least two spacer engagement jaws that are arranged at an equal angular distance in a circumferential direction on the spacer retaining means, wherein the spacer engagement jaws are arranged to be driven or withdrawn linearly in a radial direction in a horizontal plane between a first position in which the spacer engagement jaws are placed radially in the central aperture of one of the spacers in the stack, and a second position in which the spacer engagement jaws are placed in engagement with the inner ring of the central aperture of said one spacer, wherein the bead retaining means and the spacer retaining means are arranged concentrically on a common support for picking up and transferring said one spacer with a related bead supported on said one spacer, wherein the bead retaining means is arranged for picking up the related bead from said one spacer during or after the transferring of said one spacer, wherein the spacers are each provided with a respective conical surface oriented at a common spacer angle with respect to the horizontal when the spacers are arranged horizontally and the driving of each of the bead engagement jaws is configured to occur linearly along a respective path for each of the bead engagement jaws which is inclined with respect to the horizontal by an angle equal to the spacer angle.

2. The device according to claim 1, characterised in that the spacer retaining means is provided with two spacer engagement jaws placed opposite each other, and the spacer retaining means is further provided with two balancing pins placed opposite each other and at an equal angular distance between the spacer engagement jaws.

3. The device according to claim 1, characterised in that the spacer angle has a value in a range of 8° to 20° with respect to the horizontal when the spacers are arranged horizontally.

4. The device according to claim 1, characterised in that each bead, when in the vertical stack, possesses a respective bead apex with a lower face oriented at an angle to the horizontal which is 1° to 3° larger than the spacer angle of the conical surfaces of the spacers in the vertical stack.

5. The device according to claim 1, characterised in that the device is provided with a servomotor and a cardan joint for the bead engagement jaws.

6. The device according to claim 1, characterised in that the device is provided with a pneumatic drive for the spacer engagement jaws.

7. The device according to claim 1, characterised in that the support is further provided with tyre engagement jaws for engaging a green tyre and for removing the green tyre from the tyre building machine.

8. The device according to claim 1, characterised in that the device comprises a collection unit for receiving empty spacers, wherein the bead engagement jaws are arranged for separating the related bead of the one spacer from the one spacer while the common support is moving the one spacer towards the collection unit.

9. The device according to claim 8, characterised in that the engagement jaws of the bead retaining means and the spacer engagement jaws are arranged for releasing the picked up spacer while retaining the picked up bead.

10. The device according to claim 1, wherein the spacer engagement jaws are arranged to engage the one spacer at a position that is located above a directly underlying spacer in the stack.

11. The device according to claim 1, wherein the device is configured such that the device is capable of using the spacer engagement jaws such that when they engage the one spacer, they do not contact lower spacers in the stack.

* * * * *